US009552554B2

(12) United States Patent
Campbell et al.

(10) Patent No.: US 9,552,554 B2
(45) Date of Patent: Jan. 24, 2017

(54) BAYES NETWORK FOR TARGET IDENTIFICATION

(71) Applicant: Raytheon Corporation, Waltham, MA (US)

(72) Inventors: Timothy Campbell, El Segundo, CA (US); David S. Douglas, El Segundo, CA (US); Ryan Quiller, El Segundo, CA (US); Gregory O. Gheen, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 22 days.

(21) Appl. No.: 14/558,143

(22) Filed: Dec. 2, 2014

(65) Prior Publication Data

US 2016/0155064 A1     Jun. 2, 2016

(51) Int. Cl.
G06N 99/00     (2010.01)
G06N 5/02     (2006.01)

(52) U.S. Cl.
CPC ............ G06N 99/005 (2013.01); G06N 5/025 (2013.01)

(58) Field of Classification Search
CPC .................................................. G06N 7/005
USPC ........................................... 706/12; 701/519
See application file for complete search history.

(56) References Cited

U.S. PATENT DOCUMENTS 7,523,078 B2     4/2009   Peot et al.
2014/0324339 A1*  10/2014   Adam ................... G01S 13/726
                                                      701/519

OTHER PUBLICATIONS

Yizheng Cai ("Robust Visual Tracking for Multiple Targets" 2003).*
Herman, S. et al. A Particle Filtering Approach to FM-BAND Passive Radar Tracking and Automatic Target Recognition. IEEE Aerospace Conference Proceedings, 2002 (vol. 4), pp. 4-1789-4-1808.
Mei, W. et al. An Efficient Bayesian Algorithm for Joint Target Tracking and Classification. Proceedings 7th International Conference on Signal Processing, 2004 (vol. 3), pp. 2090-2098.
Jacobs, S. P. et al. High Resolution Radar Models for Joint Tracking and Recognition. IEEE National Radar Conference, May 1997, pp. 99-104.

(Continued)

Primary Examiner — Lut Wong
(74) Attorney, Agent, or Firm — Burns & Levinson LLP; Joseph M. Maraia

(57) ABSTRACT

A method for target identification includes receiving, at one or more processors, a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, providing, using the one or more processors, a first conditional probability distribution, a conditional probability of a target type given a number of measurements, defined inductively, and obtaining an estimate of the target type from the first conditional probability. Systems that implement the method are also disclosed.

29 Claims, 12 Drawing Sheets

(56) References Cited

OTHER PUBLICATIONS

Challa, S. et al. Joint Target Tracking and Classification Using Radar and ESM Sensors. IEEE Transactions on Aerospace and Electronic Systems 37(3) Jul. 2001: 1039-1055.
Jacobs, S. P. et al. High Resolution Radar Models for Joint Tracking and Recognition. Proc. IEEE National Radar Conference, May 1997: 99-104.
Mei, W. An Efficient Bayesian Algorithm for Joint Target Tracking and Classification. Proc. 7th International Conference on Signal Processing (vol. 3) Sep. 2004: 2090-2098.

* cited by examiner

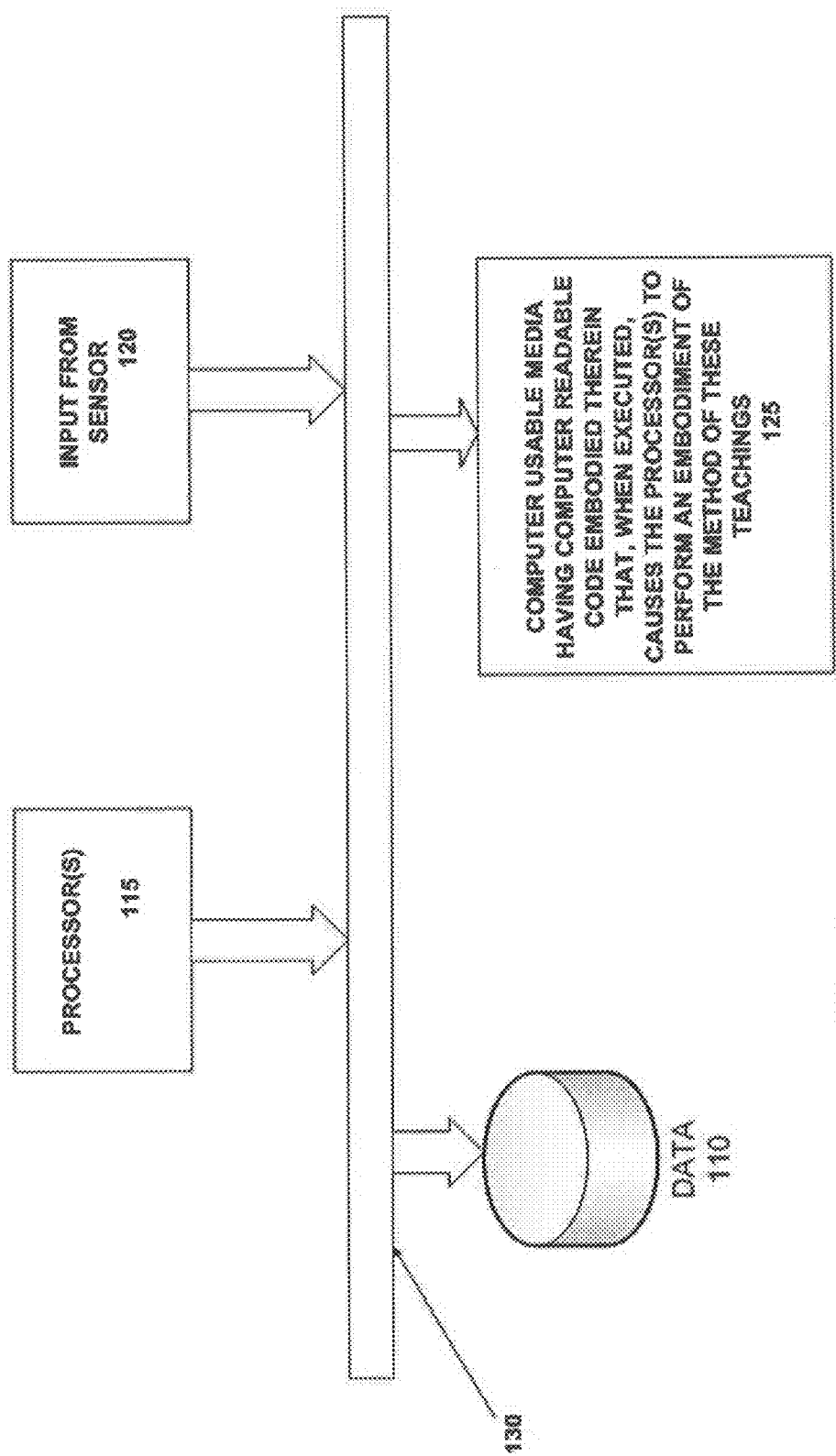

BAYES NETWORK FOR TARGET IDENTIFICATION

STATEMENT REGARDING FEDERALLY SPONSORED RESEARCH OR DEVELOPMENT

This invention was made partially with U.S. Government support from the Department of Defense under contract FA8650-08-D-1446-001. The U.S. Government has certain rights in the invention.

BACKGROUND

The present invention relates to a system and method for target identification using a Bayes optimal estimation approach.

It is often desirable that sensing systems be able to exploit the data they collect for interesting and relevant information. A task that often falls on human analysts is the examination of sensor data for targets (e.g. vehicles, buildings, people) of interest and the labeling of such objects in a manner aligned with the collection objective (e.g. friend/foe, seen before/new, authorized/unauthorized, etc.). Target detection and identification is a fundamental problem in many applications, such as in hyperspectral imaging, computer-aided diagnosis, geophysics, Raman spectroscopy and flying object identification. Under limited conditions, this task has been automated by machine learning algorithms. Such algorithms are typically trained with examples drawn from the sensor data they are meant to later process autonomously.

The problem is fundamentally one of crafting a decision rule R: $\mathbb{E} \to \mathbb{H}$ that maps evidence ($E \in \mathbb{E}$) to some element of the set of hypotheses ($\mathbb{H}$), $H_i$: E arises from $T_i$ (target i)
$H_o$: E does not sufficiently support any target Decision methods that provide a minimum decision error rate require knowledge of the posterior distribution of target type (p(T|E)).

In many instances, the physical situation from which the problem arises is expressed in a state variable representation. The internal state variables are the smallest possible subset of system variables that can represent the entire state of the system at any given time. The state variable representation can be expressed as $$s_t = A(t)s + W$$

Where s is the vector of state variables,
$s_t$ is the time derivative of s,
A(t) is the state transition matrix, and
W is a noise vector.

Some of the states can be related to measurements while other states are not related to measurements due to sensor limitations, excessive noise and other factors. The states that are not related to the measurements are often referred to as "hidden variables" or "hidden states."

It is generally the case that the dimensionality of $\mathbb{E}$ is high and so a common approach is to use expert knowledge of the system to develop a projection to a lower dimensional measurement space h: $\mathbb{E} \to \mathbb{Z}_1 \times \mathbb{Z}_2 \ldots \times \mathbb{Z}_F$, where we presume F distinct measurement variates made from E. This approach has the distinct advantage of reducing training sample sparsity and allowing the designer to exploit 'features' with desirable properties known a-priori. This approach has the unfortunate consequence of complicating the calculation of p(T|E). In particular, unless properly conditioned, the measurement variates are correlated and may not be simply combined.

In many cases, the hidden states are replaced by estimated values.

There is a need for a target estimator that properly conditions measurement variates in the case of a series of sensor measurements collected against a target.

There is also a need for a system model that captures visible and hidden stochastic information including, but not limited to target state, target identity, and sensor measurements.

There is a further need for a dynamic mixed quadrature expression facilitating real-time implementation of the estimator.

BRIEF SUMMARY

A target estimator that properly conditions measurement variates in the case of a series of sensor measurements collected against a target, a system model that captures visible and hidden stochastic information including but not limited to target state, target identity, and sensor measurements and a dynamic mixed quadrature expression facilitating real-time implementation of the estimator are presented hereinbelow.

In one or more embodiments, the method for target identification of these teachings includes receiving, at one or more processors, a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, providing, using the one or more processors, a first conditional probability distribution, a conditional probability of a target type given a number of measurements, defined inductively by $$p(T \mid z_{1,2,\ldots,k}) = \frac{p(z_k, T \mid z_{1,2,\ldots,k-1})}{\sum_{\hat{T}} p(z_k, \hat{T} \mid z_{1,2,\ldots,k-1})}$$

$$p(z_k, T \mid z_{1,2,\ldots,k-1}) = p(z_k \mid T, z_{1,2,\ldots,k-1}) p(T \mid z_{1,2,\ldots,k-1}) =$$

$$p(T \mid z_{1,2,\ldots,k-1}) \sum_{q_k=0,1} \int p(z_k, x_k, q_k \mid T, z_{1,2,\ldots,k-1}) dx_k$$

where $p(z_{k,i}|T,x_k)$ is a conditional probability of an ith measurement at a kth instance giving a target type T and hidden states at the kth instance, and $p(T|z_{1, 2, \ldots k-1})$ is a conditional probability distribution f of a target type, T, given the plurality of measurements at the k-1$^{th}$ time, $z_1, \ldots _{k-1}$, and obtaining an estimate of the target type from the first conditional probability.

In one or more other embodiments, the method for target identification of these teachings includes receiving, at one or more processors, a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, providing, using the one or more processors, a first conditional probability distribution, a conditional probability of a target type given a number of measurements, defined inductively by $$p(T \mid z_{1,2,\ldots,k}) = \frac{p(z_k, T \mid z_{1,2,\ldots,k-1})}{\sum_{\hat{T}} p(z_k, \hat{T} \mid z_{1,2,\ldots,k-1})}$$

Where $$p(T, z_k \mid z_{1,2,\ldots k-1}) = p(T \mid z_{1,2,\ldots k-1}) \times \sum_{i=1,\ldots,|w|} p\left(z \mid \hat{U}(\sqrt{2}\,\tilde{U}k_i + \mu^w), T\right) w_i$$

Where
$p(T, z_k|z_{1,2 \ldots k-1})$ is a second conditional probability,
$p(z_k|T, x_k)$ is a third conditional probability,
a Fisher information is transformed by $F = USV^T$,
U & V are unitary, S is diagonal, $S_{ii} \geq S_{jj}$ for i>j, $$s = \max_i S_{ii} > \varepsilon$$

for some small $\varepsilon$,
an i-th column of U is denoted by $U_i$ and $\hat{U} = [U_1, \ldots, U_s]$,
$w = \hat{U}x$,
$\tilde{U}$ is lower triangular and $\tilde{U}^T\tilde{U} = P^{ww}$,
$\mu^w$ is an expectation of w at step i,
$P^{ww}$ is an expectation of $ww^T$,
a new variable v is defined by $$v = \frac{1}{\sqrt{2}} \tilde{U}^{-1}(w - \mu^w),$$

A transformed Fisher information is $\hat{F} = [\hat{U}\tilde{U}^{-1}]^T F \hat{U}\tilde{U}^{-1}$,
$q_1 = \{i : \hat{F}_{ii} \leq \alpha\}$, $q_2 = \{i : \hat{F}_{ii} > \alpha\}$ where $\alpha$ is a constant,
$\forall i \in q_1$ select Hermite order as $|\beta \hat{F}_{ii}|$ where $\beta$ is a constant yielding weights $w_i$ and knots $k_i$,
$\forall i \in q_2$ select quadrature order as $$\left\lceil \frac{\hat{F}_{ii}}{\chi} \right\rceil$$

where $\chi$ is a constant yielding weights $w_i$ and knots $k_i$,
$\otimes$ denote the column—wise Khatri—Rao product and $\hat{1}_i$ a six column vector of ones
$w = w_1 \otimes w_2 \otimes \ldots \otimes w_s$
$k = [\hat{1}_0 k_1 \hat{1}_{s-1}] \otimes [\hat{1}_1 k_2 \hat{1}_{s-2}] \otimes [\hat{1}_{s-1} k_s \hat{1}_0]$;
and obtaining an estimate of the target type from the first probability distribution.

In one or more embodiments, the target identification system of these teachings includes a memory for storing data, the memory having a data structure stored in the memory, the data structure including a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, and one or more processors operatively connected to the memory for storing data; the one or more processors being configured to implement one embodiment of the method of these teachings for target identification.

A number of other embodiments are also disclosed.

For a better understanding of the present teachings, together with other and further objects thereof, reference is made to the accompanying drawings and detailed description and its scope will be pointed out in the appended claims.

BRIEF DESCRIPTION OF THE DRAWINGS

FIG. 2a is a block diagram representation of one embodiment of the system of these teachings;

DETAILED DESCRIPTION

Figure 1:
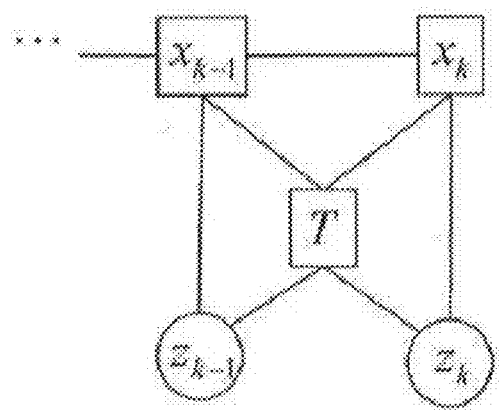
FIG. 1 is shows one embodiment of the stochastic system model of these teachings.

The following detailed description is of the best currently contemplated modes of carrying out these teachings. The description is not to be taken in a limiting sense, but is made merely for the purpose of illustrating the general principles of these teachings, since the scope of these teachings is best defined by the appended claims.

The present teachings will be more completely understood through the following description, which should be read in conjunction with the drawings. In this description, like numbers refer to similar elements within various embodiments of the present disclosure. Within this description, the claims will be explained with respect to embodiments. The skilled artisan will readily appreciate that the methods, apparatus and systems described herein are merely exemplary and that variations can be made without departing from the spirit and scope of the disclosure. As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

Before describing the present teachings in detail, certain terms are defined herein for the sake of clarity.

"Fisher information," as used herein, is a measure of the amount of information that an observable random variable X carries about an unknown parameter θ upon which the probability of X depends.

"Quadrature," as used herein, is an approximation of the definite integral of a function, usually stated as a weighted sum of function values at specified points within the domain of integration.

Adaptive quadrature, as used herein, describes approximating a definite integral of a function by a sum of approximations of definite integrals over subintervals.

In one type of quadrature, the quadrature rule is constructed to yield an exact result for polynomials of degree 2n−1 or less by a suitable choice of the points $x_i$ and weights $w_i$ for i=1, . . . , n.

The order of a quadrature rule, or quadrature order, as used herein, is the degree of the lowest degree polynomial that the rule does not integrate exactly.

A knot, as used herein, is a point at which an approximation over one interval connects continuously to an approximation over another interval.

A "whitening transformation," as used herein, is a decorrelation transformation that transforms a set of random variables having a known covariance matrix M into a set of new random variables whose covariance is the identity matrix (meaning that they are uncorrelated and all have variance).

"Kronecker product," as used herein, denoted by $\otimes$, is an operation on two matrices of arbitrary size resulting in a block matrix.

The "Khatri-Rao product," as used herein, is defined as $$A*B = (A_{ij} \otimes B_{ij})_{ij}$$

in which the ij-th block is the $m_i p_i \times n_j q_j$ sized Kronecker product of the corresponding blocks of A and B, assuming the number of row and column partitions of both matrices is equal.

The "Bayes classifier," as used herein, is defined as $$C^{Bayes}(x) = \underset{r \in \{1,2,\ldots,K\}}{\operatorname{argmax}} P(Y = r \mid X = x).$$

Although the invention has been described with respect to various embodiments, it should be realized these teachings are also capable of a wide variety of further and other embodiments within the spirit and scope of the appended claims.

A target estimator that properly conditions measurement variates in the case of a series of sensor measurements collected against a target, a system model that captures visible and hidden stochastic information including but not limited to target state, target identity, and sensor measurements and a dynamic mixed quadrature expression facilitating real-time implementation of the estimator are presented hereinbelow The method and system of these teachings include a stochastic system model, capturing visible and hidden stochastic information including but not limited to target state, target identity, and sensor measurements, and a Bayes' optimal estimator of target identity over multiple coherent sensor integration periods. In one instance, the method and system of these teachings also include a dynamic mixed quadrature facilitating real-time implementation of the estimator.

The stochastic system model of these teachings, shown in FIG. 1, captures correlation between target type, target state, and measurements. Referring to FIG. 1, □ represents and contains a hidden random variable, ○ represents and contains an observable random variable, and / represents the correlation between two random variables. In the stochastic system model shown in FIG. 1, $x_l = \{x_{l,1}, x_{l,2}, \ldots, x_{l,M}\}$: all relevant time-dependent hidden states of target at look $l \in \{1, 2, \ldots K\}$ $z_l = \{z_{l,1}, z_{l,2}, \ldots, z_{l,F}\}$: F target measurements at look l T: hidden target type.

This system model of these teachings can be differentiated from current target identification (CID) that treat consecutive measurements as independent and identically distributed (i.i.d.). This is because over small periods of time target state (of which measurements are a function) is a correlated Markov process. This methodology provides an additional benefit in that measurements exhibit statistical independence when conditioned on target state and type, that is $$p(z_{k,i}, z_{k,j} \mid x_k, T) = p(z_{k,i} \mid x_k, T) p(z_{k,j} \mid x_k, T), i \neq j$$

The joint density of hidden variables includes K×F×M+1 variates, which must be marginalized to yield a target type posterior. For a typical problem this would imply hundreds or thousands of variables.

The Bayes Optimal Estimator of these teachings is disclosed hereinbelow.

The goal is an estimate of $p(T \mid z_{1,2,\ldots,k})$ at each look k.

$$p(T \mid z_{1,2,\ldots,k}) = \int p(x_k, T \mid z_{1,2,\ldots,k}) dx_k$$

$$p(x_k, T \mid z_{1,2,\ldots,k}) = \frac{p(z_k \mid T, x_k) p(x_k \mid T, z_{1,2,\ldots,k-1}) p(T \mid z_{1,2,\ldots,k-1})}{p(z_k \mid z_{1,2,\ldots,k-1})}$$

Now using Chapman-Kolmogorov for the type-conditional target state Markov chain, $$p(x_k, x_{k-1} \mid T, z_{1,2,\ldots,k-1}) = p(x_k \mid x_{k-1}, T, z_{1,2,\ldots,k-1}) p(x_{k-1} \mid T, z_{1,2,\ldots,k-1})$$

$$p(x_k \mid T, z_{1,2,\ldots,k-1}) = \int p(x_k \mid x_{k-1}, T, z_{1,2,\ldots,k-1}) p(x_{k-1} \mid T, z_{1,2,\ldots,k-1}) dx_{k-1}$$

$$p(x_k \mid T, z_{1,2,\ldots,k-1}) = \int p(x_k \mid x_{k-1}, T) p(x_{k-1} \mid T, z_{1,2,\ldots,k-1}) dx_{k-1}$$

So the target-conditional target state posterior is recursively calculated, $$p(x_k, T \mid z_{1,2,\ldots,k}) = p(z_k \mid T, x_k)$$

$$\frac{p(T \mid z_{1,2,\ldots,k-1}) \int p(x_k \mid x_{k-1}, T) p(x_{k-1} \mid T, z_{1,2,\ldots,k-1}) dx_{k-1}}{p(z_k \mid T, z_{1,2,\ldots,k-1})} =$$

$$\prod_{i=1\ldots F} p(z_{k,i} \mid T, x_k)$$

$$\frac{p(T \mid z_{1,2,\ldots,k-1}) \int p(x_k \mid x_{k-1}, T) p(x_{k-1} \mid T, z_{1,2,\ldots,k-1}) dx_{k-1}}{p(z_k \mid T, z_{1,2,\ldots,k-1})}$$

Combining equations, $$p(T \mid z_{1,2,\ldots,k}) = \int \left[ \prod_{i=1}^{F} p(z_{k,i} \mid T, x_k) \right.$$

$$\left. \frac{p(T \mid z_{1,2,\ldots,k-1}) \int p(x_k \mid x_{k-1}, T) p(x_{k-1} \mid T, z_{1,2,\ldots,k-1}) dx_{k-1}}{p(z_{1,2,\ldots,k-1})} \right] dx_k$$

This formulation provides a framework for the fusion of features, which are integrated in a manner which makes them independent of one-another. It also includes optimal treatment of the correlation between target type, observed features, and time-dependent target state. An inductive formulation allows for online implementation, however each step of the recursion requires two integrations over target state, which includes F variates. A typical value of F is 10-20, which requires numerical finesse for real time implementation on modern microprocessors.

In order to start the induction, the initial joint probability can be estimated from measurements (see, for example, Mauricio Monsalve, A methodology for estimating joint probability density functions, Apr. 15, 2009, a copy of which is incorporated by reference herein in its entirety and for all purposes) or can be assumed to be a known form, typically Gaussian, with estimated parameters.

In one or more embodiments, the method for target identification of these teachings includes receiving, at one or more processors, a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, providing, using the one or more processors, a first conditional probability distribution, a conditional probability of a target type given a number of measurements, defined inductively by $$p(T \mid z_{1,2,\ldots,k-1}) = \frac{p(z_k, T \mid z_{1,2,\ldots,k-1})}{\sum_{\hat{T}} p(z_k, \hat{T} \mid z_{1,2,\ldots,k-1})}$$

$$p(z_k, T \mid z_{1,2,\ldots,k-1}) = p(z_k \mid T, z_{1,2,\ldots,k-1}) p(T \mid z_{1,2,\ldots,k-1}) =$$

$$p(T \mid z_{1,2,\ldots,k-1}) \sum_{q_k=0,1} \int p(z_k, x_k, q_k \mid T, z_{1,2,\ldots,k-1}) dx_k$$

where $p(z_{k,i}|T,x_k)$ is a conditional probability of an ith measurement at a kth instance giving a target type T and hidden states at the kth instance, and $p(T|z_{1, 2, \ldots k-1})$ is a conditional probability distribution f of a target type, T, given the plurality of measurements at the k-1$^{th}$ time, $z_{1, \ldots k-1}$, and obtaining an estimate of the target type from the first conditional probability.

In one embodiment, the estimate is obtained using a Bayes Classifier. It should be noted that other decision rules, such as a likelihood ratio test and even decision rules under the Neyman Pearson formalism are within the scope of these teachings.

In one instance, wherein $p(x_k|x_{k-1},T)$ is a multivariate Gaussian distribution and wherein $p(x_k|T, z_k)$ is another multivariate Gaussian distribution, where $p(x_k|x_{k-1},T)$ is a conditional probability distribution of hidden states at instance k given hidden states at instance k-1 and target type T. In one embodiment of that instance, transition between one hidden state at one instance and the one hidden state at another instance is given by a predetermined dynamic model (referred to as $f_k(x_{k-1}, T)$) and wherein an expectation of $p(x_k|T, z_{1,2, \ldots k-1})$ is given by $$p(x_k|T, z_{1,2,\ldots,k-1}) = N(x_k; \mu_{k,k-1}^{x|T}, P_{k,k-1}^{xx|T})$$

$$\mu_{k,k-1}^{x|T} = \int f_k(x_{k-1}) N(x_k; \mu_{k-1,k-1}^{x|T}, P_{k-1,k-1}^{xx|T}) dx_{k-1}$$

and a covariance matrix is given inductively by $$P_{k,k-1}^{xx|T} = Q_k + \int f_k(x_{k-1}) f_k^T(x_{k-1}) N(x_k; \mu_{k-1,k-1}^{x|T}, P_{k-1,k-1}^{xx|T}) dx_{k-1} - [\mu_{k,k-1}^{x|T}]^T \mu_{k,k-1}^{x|T}.$$

In the above embodiment, $p(x_k|T, z_{1,2, \ldots k-1})$ is a multivariate Gaussian distribution. In one instance, measurements are a predetermined function of target state and type (referred to as $h_k(x_k, T)$).

In one embodiment, the measurements $z_i$ include one or more of a range to the target, a rate of change of a range to the target, an acceleration along a line of sight.

In one or more embodiments, the hidden states $x_i$ include one or more of target geometry, target attitude, target velocity.

In one or more embodiments, the target types include one or more of types of vehicles. It should be noted that these teachings are not limited to only those embodiments. Recognition of targets is a problem that is found in a large number of technical areas and the present teachings are applicable to all of those technical areas.

In one or more embodiments, the target identification system of these teachings includes a memory for storing data, the memory having a data structure stored in the memory, the data structure including a number of measurements of a target, each measurement from the number of measurements being observed at a predetermined time ($z_k$), a number of target types (T), each one of the number of measurements, each one the number of target type and each one of one or more hidden states, each hidden state ($x_k$) being characterized at the predetermined time, being correlated to one another, and one or more processors operatively connected to the memory for storing data; the one or more processors being configured to implement one embodiment of the method of these teachings for target identification.

Figure 2:
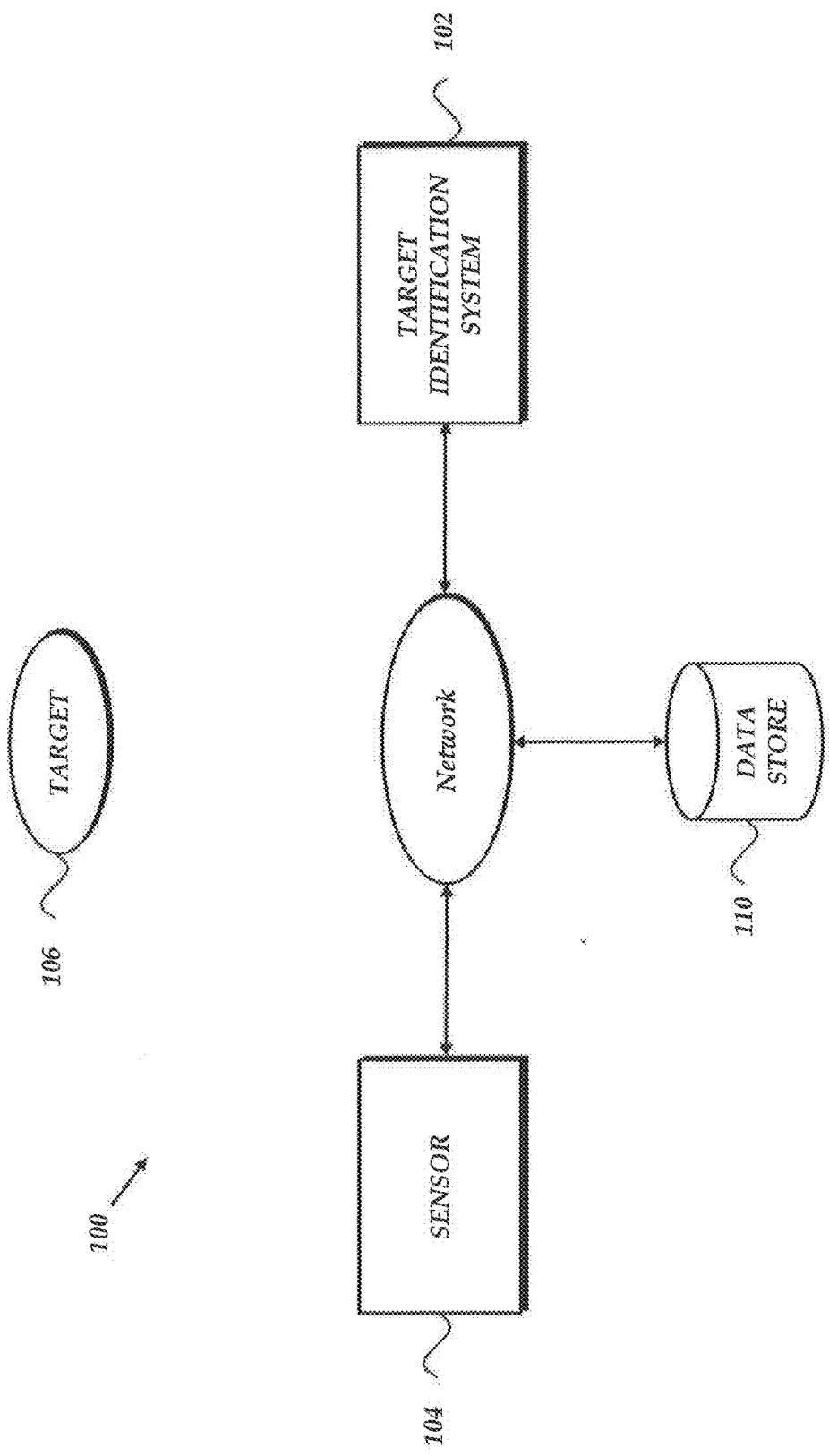
FIG. 2 is a block diagram representation depicting operation of one embodiment of the system of these teachings.

FIG. 2 shows operation 100 of one embodiment of the target identification system of these teachings. Referring to FIG. 2, a target 106 is detected by a sensor 104 and the output of the sensor is stored in a memory 110 and provided to the target identification system 102. In the embodiment shown, the system is distributed and the sensor 104, the memory 110 and the target identification system 102 are connected through a network. It should be noted that other embodiments in which the system is not distributed are also within the scope of these teachings.

FIG. 2a shows one embodiment of the target identification system of these teachings. Referring to FIG. 2a, in the embodiment shown there in, the system has one or more processors 115, can receive input from the sensor via an input component 120 and the one or more processors 115 are operatively connected to the memory 110 and to computer usable media 125 that has computer readable code embodied therein, which, when executed by the one or more processors 115, causes the one or more processors 115 to perform an embodiment of the method for target identification of these teachings. The one or more processors 115 are operatively connected to the memory 110 and to computer usable media 125 by a connection component 130, which can be a single connection component, such as a computer bus, or a combined connection component including a network, for distributed components, and another connection component for parts of the system that are physically connected.

The inductive formulation, although amenable to online implementation, requires a large number of integrations over the target state. A computational strategy that implements a recursive estimator in a manner that is more easily implemented in a real time system is presented herein below.

Figure 3A:
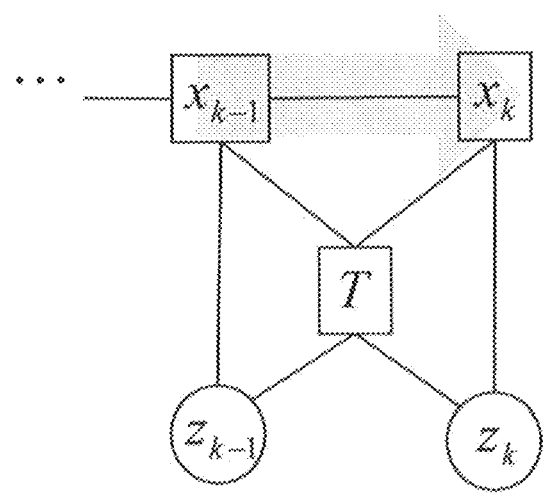
FIGS. 3a-3c are embodiments of the stochastic system model of these teachings.

In the first step of the computational strategy, a target type dependent dynamic model is used to capture the state evolution between measurements. The first step is shown schematically in the stochastic system model diagram shown in FIG. 3a.

The state transition is considered as the sum of a deterministic function ($f_k$) of the previous state and independent Gaussian noise (below the function N(•; u,P) denotes a multivariate Gaussian with mean u and covariance P), $$p(x_k|x_{k-1},T) = N(x_k; f_k(x_{k-1},T), Q_k).$$

From the derivation of the estimator, $$p(x_k|T,z_{1,2,\ldots,k-1}) = \int p(x_k|x_{k-1},T)$$
$$p(x_{k-1}|T,z_{1,2,\ldots,k-1})dx_{k-1}$$

Thus, $$p(x_k|T,z_{1,2,\ldots,k-1}) = \int N(x_k; f_k(x_{k-1},T), Q_k)$$
$$p(x_{k-1}|T,z_{1,2,\ldots,k-1})dx_{k-1}$$

Taking the expectation of this density, $$E\{x_k \mid T, z_{1,2,\ldots,k-1}\} = \int x_k p(x_k \mid T, z_{1,2,\ldots,k-1})dx_k =$$
$$\int x_k \int N(x_k; f_k(x_{k-1}), Q_k)p(x_{k-1} \mid T, z_{1,2,\ldots,k-1})dx_{k-1}dx_k =$$
$$\int \left[\int x_k N(x_k; f_k(x_{k-1}), Q_k)dx_k\right] p(x_{k-1} \mid T, z_{1,2,\ldots,k-1})dx_{k-1} =$$
$$\int f_k(x_{k-1})p(x_{k-1} \mid T, z_{1,2,\ldots,k-1})dx_{k-1}$$

If the target type-conditional state posterior from the previous measurement is Gaussian, $$p(x_{k-1}|T,z_{1,2,\ldots,k-1}) = N(x_k; \mu_{k-1,k-1}^{x|T}, P_{k-1,k-1}^{xx|T})$$

where $\mu_{m,n}^{a|T}$ denotes $E\{a|T\}$ at step m using evidence up to step n and $P_{m,n}^a = E\{aa^T\}$
Then, $$p(x_k|T,z_{1,2,\ldots,k-1}) = N(x_k; \mu_{k,k-1}^{x|T}, P_{k,k-1}^{xx|T})$$

$$\mu_{k,k-1}^{x|T} = \int f_k(x_{k-1})N(x_k; \mu_{k-1,k-1}^{x|T}, P_{k-1,k-1}^{xx|T})dx_{k-1}$$

The covariance is derived similarly as, $$P_{k,k-1}^{xx|T} = Q_k + \int f_k(x_{k-1})f_k^T(x_{k-1})N(x_k; \mu_{k-1,k-1}^{x|T}, P_{k-1,k-1}^{xx|T})dx_{k-1} - [\mu_{k,k-1}^{x|T}]^T \mu_{k,k-1}^{x|T}$$

To calculate these moments requires the solution of an M-dimensional quadrature problem. However this formulation is similar to the Kalman filter, and depending on the nature of the target dynamics model many techniques are available that provide accurate real-time solutions.

Figure 3B:
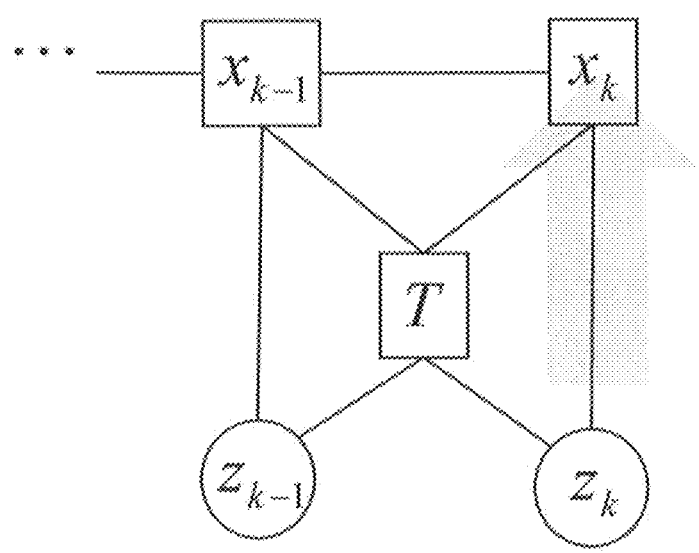

In the second step of the computational strategy, a target state posterior conditioned on type, $$p(x_k|T,z_{1,2,\ldots,k})$$

is determined. The second step is shown schematically in the stochastic system model diagram shown in FIG. 3b.

The measurements are considered as a deterministic function of target state and type and corrupted by independent noise, $$p(z_k|x_k,T) = N(z_k; h_k(x_k,T), R_k)$$

$x_k$ & $z_k$ are considered to be jointly Gaussian and approximated with the predictive density, $$p(x_k, z_k \mid T, z_{1,2,\ldots,k-1}) \approx N\left(\begin{bmatrix} x_k \\ z_k \end{bmatrix}; \begin{bmatrix} \mu_{k,k-1}^{x|T} \\ \mu_{k,k-1}^{z|T} \end{bmatrix}, \begin{bmatrix} P_{k,k-1}^{xx|T} & P_{k,k-1}^{xz|T} \\ P_{k,k-1}^{zx|T} & P_{k,k-1}^{zz|T} \end{bmatrix}\right)$$

Where, $$\mu_{k,k-1}^{z|T} = \int h_k(x_k, T)N(x_k; \mu_{k,k-1}^{x|T}, P_{k,k-1}^{xx|T})dx_k$$

$$P_{k,k-1}^{zz|T} = R_k + \int h_k(x_k, T)h_k^T(x_k, T)N(x_k; \mu_{k,k-1}^{x|T}, P_{k,k-1}^{xx|T})dx_{k-1} - [\mu_{k,k-1}^{z|T}]^T \mu_{k,k-1}^{z|T}$$

$$P_{k,k-1}^{xz|T} = \int x_k h_k^T(x_k, t)N(x_k; \mu_{k,k-1}^{x|T}, P_{k,k-1}^{xx|T})dx_k - \mu_{k,k-1}^{x|T}[\mu_{k,k-1}^{z|T}]^T$$

Then the approximate conditional target state posterior density is, $$p(x_k|T,z_{1,2,\ldots,k}) \approx N(x_k; \mu_{k,k-1}^{x|T} + P_{k,k-1}^{xz|T}[P_{k,k-1}^{zz|T}]^{-1}(z_k - \mu_{k,k-1}^{z|T}),$$
$$P_{k,k-1}^{xx|T} - P_{k,k-1}^{xz|T}[P_{k,k-1}^{zz|T}]^{-1}P_{k,k-1}^{zx|T})$$

As shown previously above, the result includes an M dimensional integral of the form $$I = \int f(x)N(x;\mu^x, P^{xx})dx$$

At this stage of the calculation, measurement data is being employed to refine hidden target state estimates, for which computationally efficient numerical methods are available (again by virtue of work done on Kalman filters).

Figure 3C:
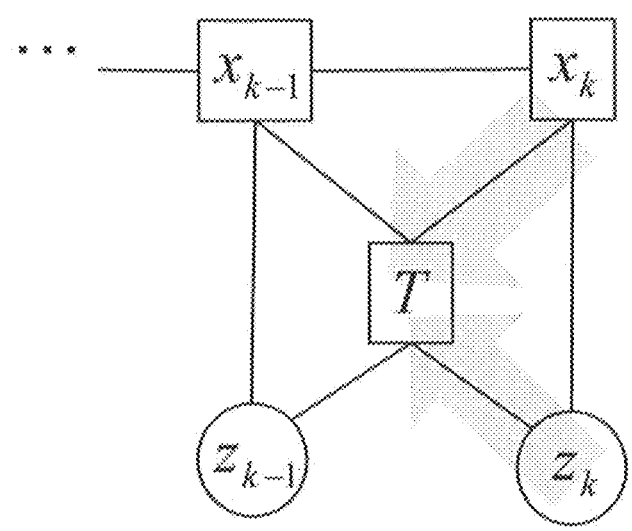

In the third step of the computational strategy, a final estimate of the target type density is generated. The third step is shown schematically in the stochastic system model diagram shown in FIG. 3c.

Inductively, from $p(T|z_{1,2,\ldots,k-1})$, obtain $$p(T|z_{1,2,\ldots,k-1}) = \frac{p(z_k, T|z_{1,2,\ldots,k-1})}{\sum_{\hat{T}} p(z_k, \hat{T}|z_{1,2,\ldots,k-1})}$$

$$p(z_k, T|z_{1,2,\ldots,k-1}) = p(z_k|T, z_{1,2,\ldots,k-1})p(T|z_{1,2,\ldots,k-1}) =$$
$$p(T|z_{1,2,\ldots,k-1})\int p(z_k, x_k, q_k|T, z_{1,2,\ldots,k-1})dx_k =$$
$$p(T|z_{1,2,\ldots,k-1})\int p(z_k|T, x_k)p(x_k|T, z_{1,2,\ldots,k-1})dx_k =$$
$$p(T|z_{1,2,\ldots,k-1})\int p(z_k|T, x_k)N(x_k; \mu_{k,k-1}^{x|T}, P_{k,k-1}^{xx|T})dx_k$$

Traditional methods do not yield sufficiently accurate solutions to this integral because non-linear functions with 'narrow' modes break band-limited quadrature schemes such as the unscented transform and sequential Monte Carlo (e.g. particle filters). An adaptive quadrature and subspace partitioning scheme of these teachings is disclosed herein below.

The adaptive quadrature and subspace partitioning scheme of these teachings includes subspace partitioning, whitening and mixed quadrature, the details of which are disclosed herein below.

Subspace Partitioning

An accurate real-time calculation of an M-dimensional integral of the form, $$I = \int p(z|x,T)N(x;\mu^x, P^{xx})dx$$

is desired.

Variable indexing is dropped for notational convenience in the discussion of quadrature. Denote each variate of x: $x = [x_1, x_2, \ldots x_N]^T$ and each variate of z: $z = [z_1, z_2, \ldots z_F]^T$. Measurement Fisher information is defined as, $$F_{i,j}(x, T) = \int \left(\frac{\partial}{\partial x_i} \log p(z|x, T) \frac{\partial}{\partial x_j} \log p(z|x, T)\right) p(z|x, T)dz$$

By construction the measurement model is a deterministic function h corrupted by white additive noise with covariance R, so the Fisher information of the i-th and j-th variates of x becomes, $$F_{i,j}(x, T) = \frac{\partial h(x, T)^T}{\partial x_i} R^{-1} \frac{\partial h(x, T)}{\partial x_j}$$

A further simplification can be made during implementation since by construction each variate of z is independent given x and T and R is diagonal.

Analytically or numerically compute the Fisher information matrix F. Depending on the specific form of the problem domain one either lets $x=\mu^x$ or approximately marginalizes out x in F, making this calculation computationally efficient.

Now, by a numerical method such as singular value decomposition,
There are U, V, S in $\Re^{N \times N}$ such that U & V are unitary, S is diagonal, $S_{ii} \geq S_{jj}$ for i>j,
and $F=USV^T$ $$s = \max_i S_{ii} \geq \varepsilon$$

for some small $\varepsilon$
Denote the i-th column of U by $U_i$ and define $\hat{U}=[U_1, \ldots, U_s]$
Define a new s-dimensional variate $w=\hat{U}x$, reducing I to an s-dimensional integral $$I = \int p(z|\hat{U}w, T)N(w; \hat{U}^T\mu^x, U^T P^{xx}\hat{U})dw =$$

$$\int p(z|\hat{U}w, T)N(w; \mu^w, p^{ww})dw$$

Whitening
There is a $\tilde{U}$ in $\Re^{S \times S}$ such that $\tilde{U}$ is lower triangular and $\tilde{U}^T\tilde{U}=P^{ww}$
Transform variables to a new variate v $$v = \frac{1}{\sqrt{2}} \tilde{U}^{-1}(w - \mu^w)$$

Then the following is obtained $$I = \frac{\sqrt{2}}{(2\pi)^{\frac{s}{2}}} \int p(z|\hat{U}(\sqrt{2}\tilde{U}v + \mu^w), t)e^{-v^T v}dv$$

Mixed Quadrature
The transformed Fisher information is $\hat{F}=[\hat{U}\tilde{U}^{-1}]^T F \hat{U}\tilde{U}^{-1}$
Define $q_1=\{i: \hat{F}_{ii} \leq \alpha\}$, $q_2=\{i: \hat{F}_{ii} > \alpha\}$ where $\alpha$ is a constant
Employ Hermite approximation for $q_1$ variates & standard numerical techniques for $q_2$ $\forall i \in q_1$ select Hermite order as $\lceil \beta \hat{F}_{ii} \rceil$ where $\beta$ is a constant yielding weights $w_i$ and knots $k_i$ $\forall i \in q_2$ select quadrature order as $$\left\lceil \frac{\hat{F}_{ii}}{\chi} \right\rceil$$

where $\chi$ is a constant yielding weights $w_i$ and knots $k_i$ Let $\otimes$ denote the column—wise Khatri—Rao product and $\hat{1}_i$ a six column vector of ones $$w = w_1 \otimes w_2 \otimes \ldots \otimes w_s$$

$$k = [\hat{1}_0 k_1 \hat{1}_{s-1}] \otimes [\hat{1}_1 k_2 \hat{1}_{s-2}] \otimes \ldots \otimes [\hat{1}_{s-1} k_s \hat{1}_0]$$

$$I = \frac{\sqrt{2}}{(2\pi)^{\frac{s}{2}}} \int p(z|\hat{U}(\sqrt{2}\tilde{U}v + \mu^w), t)e^{-v^T v}dv \approx$$

$$\sum_{l=1,\ldots,|w|} p(z|\hat{U}(\sqrt{2}\tilde{U}k_i + \mu^w), t)w_i$$

To illustrate the performance gains of the method of these teachings as compared to conventional target identification methods, a reduced-dimensional problem whose states are easy to convey graphically is disclosed herein below. In this example, presume the observer and target are embedded on the real line with the observer stationary at the origin—this represents simplification of observer-to-target line of sight. The target state is fully described by its range and 'orientation' with respect to the line of sight. The target velocity is constant, however its speed along the line of sight varies with the cosine of its orientation. Both target states are observable, but severely corrupted by noise. Finally, the wingspan of the target projected onto plane normal to the line-of-sight (which is its wingspan scaled by the cosine of its orientation) is observable as an ID feature.

Figure 4:
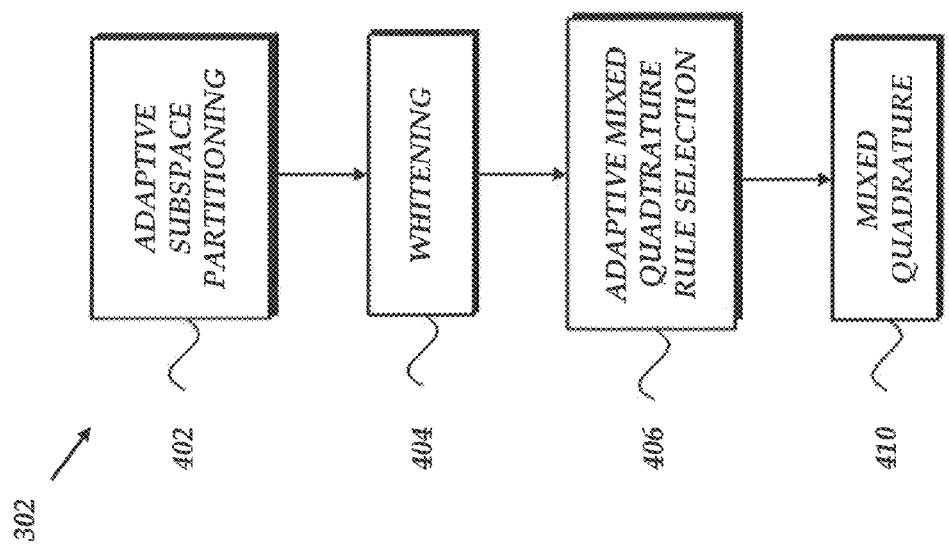
FIG. 4 is a flowchart representation of the adaptive quadrature method of these teachings.

An embodiment of the method for adaptive quadrature of these teachings is summarized in FIG. 4. Referring to FIG. 4, in the embodiment 302 shown there in, adaptive subspace partitioning 402 is first performed, followed by whitening 404, and then followed by adaptive mixed quadrature rule selection 406. Finally, the mixed quadrature result 410 is obtained.

Figure 5:
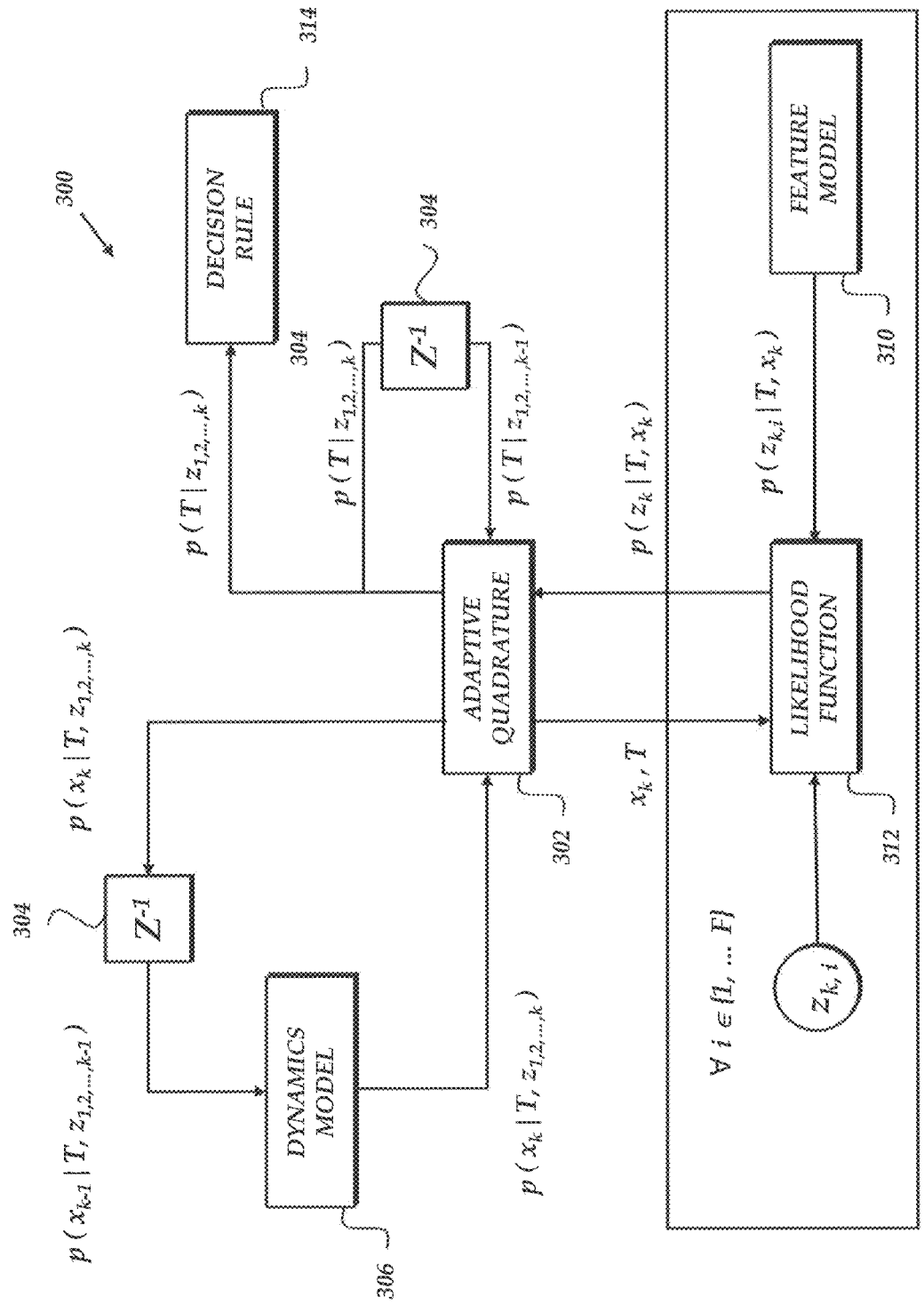
FIG. 5 is a flowchart representation of one embodiment of the method of these teachings.

The entire computational strategy disclosed hereinabove is summarized in FIG. 5. Referring to FIG. 5, the target type dependent dynamics model 306 is used to provide evolution from the hidden state at one look or time, $p(x_{k-1}|T,z_{1,2,\ldots,k-1})$ to the hidden states at the subsequent look or time, $p(x_k|T,z_{1,2,\ldots,k})$. The time delay 304 can be symbolic, showing the relationship between the two looks or times. (In some instances, the (k+1)th state is used with the time delay 304 to obtain the kth state.) The measurements, $z_k$, the hidden states and the target type, $x_k$,T, together with the output from the feature model 310 are combined in the likelihood function 312 in order to provide $p(z_k|x_k,T)$.

The two conditional probabilities, $p(z_k|x_k,T)$ and $p(x_k|T,z_{1,2,\ldots,k})$, as well as $p(T|z_{1,2,\ldots,k-1})$ are provided to the adaptive quadrature method 302 in order to obtain $p(T|z_{1,2,\ldots,k})$, the conditional probability of the target type given the measurements. Finally, $p(T|z_{1,2,\ldots,k})$ is provided to the decision rule 314 in order to obtain an estimate of the target type.

In order to illustrate these teachings, results for simple example of provided herein below. This simple example serves to motivate elements of the method. It is a surrogate for more complex simulated ID problems which have we have found show similar performance gains, but whose inner workings are difficult to present graphically because of their high dimensionality. For example, this simple example is related to an airborne sensor system tasked with the recognition of airborne vehicle type while the vehicles are under motion.

Figure 6:
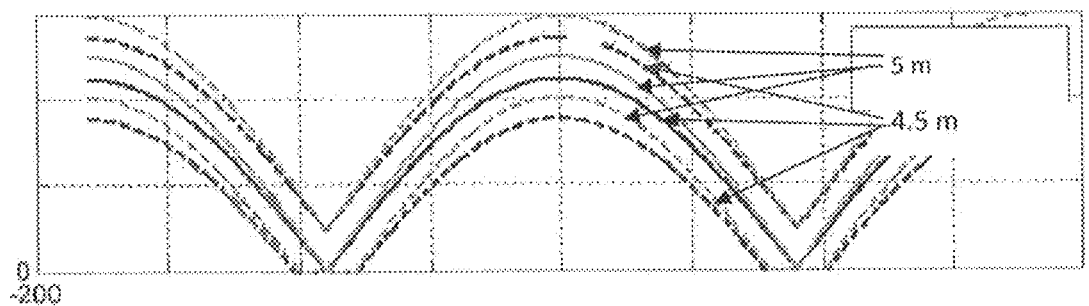
FIG. 6 is a graphical representation of wingspan measurements used in an exemplary embodiment of these teachings.

This example includes two targets, one with a 4.5 m wingspan, and one with a 5 m wingspan. FIG. 6 shows wingspan measurement as a function of heading angle, bounded by 3-sigma bounds for each target model.

It is apparent that target extent is a type-discriminative feature, but measured in isolation it is insufficient for identification. This is because the marginal probability density of measured wingspan (i.e. not conditioned on heading angle) is very uninformative. For example, only an extremely long wingspan measurement, e.g. clearly a 6 m, would be clearly attributable a single model.

Figure 7:
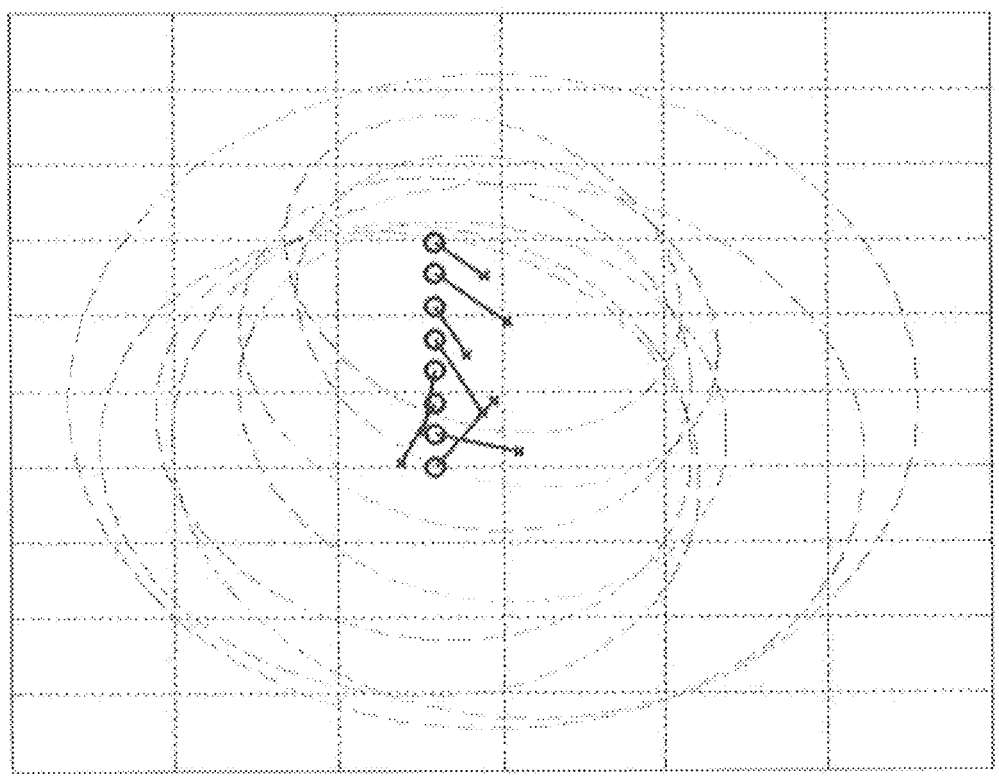
FIG. 7 is a graphical representation of measurements and estimations used in an exemplary embodiment of these teachings.

If some notion of the kinematic state of the target can be concurrently developed, it might be used to constrain latent nuisance parameters (e.g. heading angle) in the target type estimation problem. In our example, it is considered that at each time step one can measure target state, with 5 m 1-sigma range measurements and 30 deg 1-sigma heading measurements. These measurements are then MMSE filtered as one might in a tracking system. In FIG. 7, the true state is plotted in circles at each time step, with the target moving from near range to far range. The corresponding state estimate is plotted with a red-x and circled by a 95% confidence interval.

Figure 8:
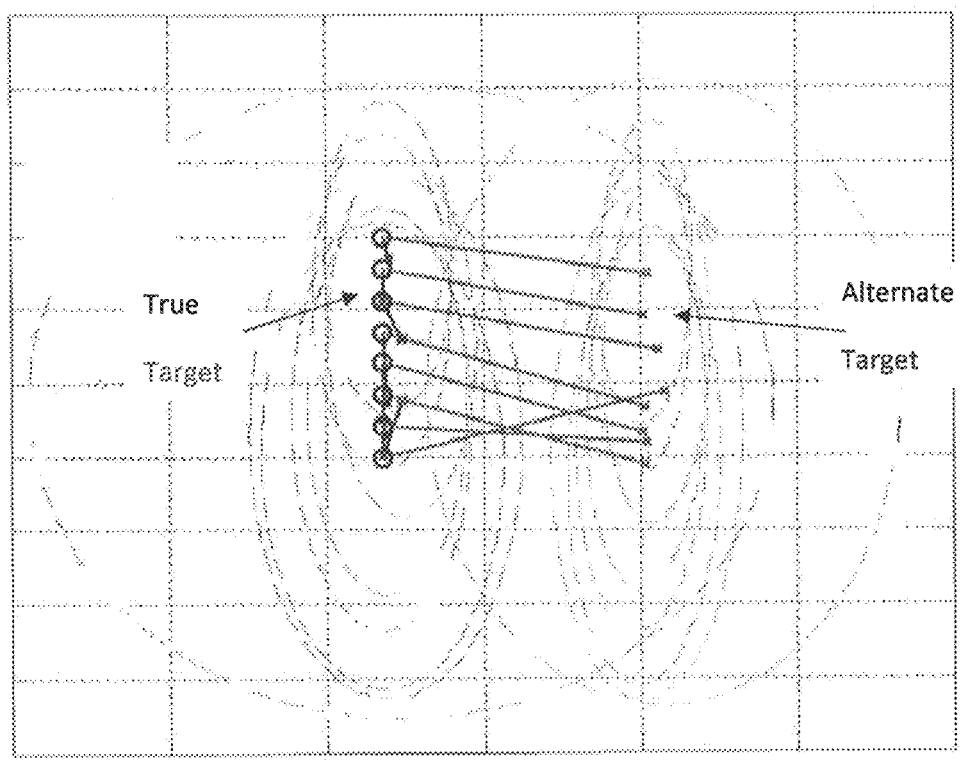
FIG. 8 is a graphical representation of a target identification obtained from MS is different from one embodiment of these teachings.

The result of a target state estimation algorithm is clearly relevant to an ID algorithm. Instead of reasoning about the marginal p.d.f. of measured wingspan, one can reason with the p.d.f of target wingspan conditioned on target heading angle, knowing that the tracking subsystem will have given a ballpark in which heading angle truly resides. If the state estimate is used to aid the target type estimation problem, then reasonable performance may be obtained. Many existing target identification methods do precisely this. In contrast, the disclosed method combines the estimation of kinematic state and target type into a single estimation problem. In so doing, an optimal MMSE (Minimum Mean Square Error) estimate is calculated for both target type and kinematic state. To illustrate how this impacts kinematic estimates, in FIG. 8, the kinematic state estimate conditioned on each target type possibility is shown. It is apparent that the marginal kinematic state PDF is bimodal, with one mode over the true state and the other mode in an incorrect area of phase space that is more closely aligned with a kinematic state hypothesis that supports the ID-relevant feature of target span. Similarly, the marginal probability of correct ID in this same scenario is approximately 60% and a correct ID is made.

A more intuitive explanation of the method is the following: the id measurement (measured wingspan) constrains target heading angle given a particular target. A constrained heading angle in turn constrains target line-of-sight speed. Finally, a constrained line-of-sight speed dictates how target range varies from look-to-look. These constraints serve as evidence that is extremely relevant to the tracking estimator where the present teachings are attempting to develop an MMSE estimate of target range and heading angle. Conversely, for reasons described above, the evidence collected by the tracker is directly relevant to the development of an estimator for target type. Both the ID and kinematic state estimation problems are coupled by statistical correlation—a coupling that is captured by the method of these teachings' graphical model and also by its estimate of the joint p.d.f of target type and kinematic state.

Figure 9:
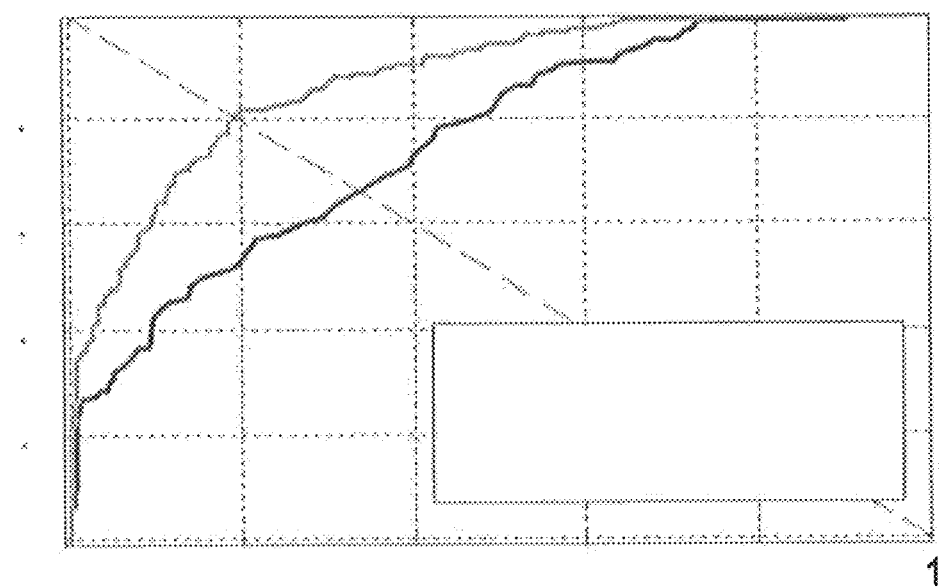
FIG. 9 represents a comparison of results of the method of these teachings and conventional methods.

The aggregate performance benefit of the disclosed method for the above example as compared to an MMSE estimator that simply leverages the tracker result is displayed in the ROC curves shown in FIG. 9. More complicated 6-dof simulations with realistic target ID features and tracking measurements exhibit similar gains.

The following is a disclosure by way of example of a device configured to execute functions (hereinafter referred to as computing device) which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an interconnect (e.g., bus and system core logic), which can interconnect such components of a computing device to a data processing device, such as a processor(s) or microprocessor(s), or other form of partly or completely programmable or pre-programmed device, e.g., hard wired and or ASIC customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using ASIC or FPGA, which may be programmable, partly programmable or hard wired. The ASIC logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80x86 or Pentium series microprocessor from Intel Corporation, a PowerPC microprocessor from IBM, a Spare microprocessor from Sun Microsystems, Inc, or a 68xxx series microprocessor from Motorola Corporation as examples.

The interconnect in addition to interconnecting devices such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The interconnect may include one or more buses connected to one another through various bridges, controllers and/or adapters. In one embodiment the I/O controller includes a Universal Serial Bus (USB) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile Random Access Memory (RAM), typically implemented as dynamic RAM (DRAM) which requires power continually in order to refresh or maintain the data in the memory, and non-volatile Read Only Memory (ROM), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application. At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an iPhone, Blackberry, Droid or the like, a manufacturing tool, or any other device including a computing device, comprising one or more data processors, etc.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. A target identification system, wherein target identification comprises flying object identification, the target identification system comprising:
   a memory for storing data comprising:
      a data structure stored in the memory, the data structure including:
         a number of measurements of a target, each measurement from the number of measurements being observed at a predetermined time ($z_k$);

a number of target types (T); each one of the number of measurements, each one the number of target type and each one of one or more hidden states, each hidden state ($x_k$) being characterized at the predetermined time, being correlated to one another;

one or more processors operatively connected to the memory for storing data; the one or more processors being configured to:

provide a first conditional probability distribution, a conditional probability of a target type given a number of measurements, defined inductively by $$p(T|z_{1,2,\ldots,k}) = p(T,z_k|z_{1,2,\ldots,k-1})/\Sigma_{T'} p(T',z_k|z_{1,2,\ldots,k-1}),$$

and $$p(z_k,T|z_{1,2,\ldots,k-1}) = p(T|z_{1,2,\ldots,k-1}) \int p(z_k|T,x_k)p(x_k|T,z_{1,2,\ldots,k-1})dx_k$$

where $p(z_{k,i}|T,x_k)$ is a conditional probability of an ith measurement at a kth instance giving a target type T and hidden states at the kth instance, and $p(T|z_{1,2,\ldots,k-1})$ is a conditional probability distribution of a target type, T, given the plurality of measurements at the $k-1^{th}$ time, $z_{1,\ldots,k-1}$; and obtain an estimate of the target type from the first conditional probability; wherein $p(x_k|x_{k-1},T)$ is a multivariate Gaussian distribution and wherein $p(x_k|T, z_k)$ is another multivariate Gaussian distribution, where $p(x_k|x_{k-1},T)$ is a conditional probability distribution of hidden states at instance k given hidden states at instance k-1 and target type T; and wherein transition between one hidden state at one instance and the one hidden state at another instance is given by a predetermined dynamic model (referred to as $f_k(x_{k-1}, T)$) and wherein an expectation of $p(x_k|T, z_{1,2,\ldots k-1})$ is given by $$\mu_{k,k-1}^{x'} = \int f_k(x_{k-1})N(x_k;\mu_{k-1,k-1}^{x|T},P_{k-1,k-1}^{xx|T})dx_{k-1}$$

and a covariance matrix is given inductively by $$-P_{k,k-1}^{xx}Q_k + \int f_k(x_{k-1})f_k^T(x_{k-1})N(x_k;\mu_{k-1,k-1}^{x}, P_{k-1,k-1}^{xx|T})dx_{k-1} - [\mu_{k,k-1}^{x}]^T\mu_{k,k-1}^{x}.$$

2. The target identification system of claim 1 further comprising a non-transitory computer usable media having computer readable code embodied therein, wherein the computer readable code, when executed by the one or more processors, causes the one or more processors to:

provide a first conditional probability distribution, a conditional probability of a target type given a number of measurements, defined inductively by $$p(T|z_{1,2,\ldots,k}) = p(T,z_k|z_{1,2,\ldots,k-1})/\Sigma_{T'} p(T',z_k|z_{1,2,\ldots,k-1})$$

and $$p(z_k,T|z_{1,2,\ldots,k-1}) = p(T|z_{1,2,\ldots,k-1}) \int p(z_k|T,x_k)p(x_k|T,z_{1,2,\ldots,k-1})dx_k$$

where $p(z_{k,i}|T,x_k)$ is a conditional probability of an ith measurement at a kth instance giving a target type T and hidden states at the kth instance, and $p(T|z_{1,2,\ldots,k-1})$ is a conditional probability distribution of a target type, T, given the plurality of measurements at the $k-1^{th}$ time, $z_{1,\ldots,k-1}$; and obtain an estimate of the target type from the first conditional probability; thereby configuring the one or more processors.

3. The target identification system of claim 1 wherein the estimate is obtained using a Bayes Classifier.

4. The target identification system of claim 1, wherein the measurements $z_i$ comprise one or more of a range to the target, a rate of change of a range to the target, an acceleration along a line of sight.

5. The target identification system of claim 1, wherein the hidden states $x_i$ comprise one or more of target geometry, target attitude, target velocity.

6. The target identification system of claim 1, wherein the plurality of target types comprise one or more of types of vehicles.

7. A target identification system, wherein target identification comprises flying object identification, the target identification system comprising:

a memory for storing data comprising:

a data structure stored in the memory, the data structure including:

a number of measurements of a target, each measurement from the number of measurements being observed at a predetermined time ($z_k$);

a number of target types (T); each one of the number of measurements, each one the number of target type and each one of one or more hidden states, each hidden state ($x_k$) being characterized at the predetermined time, being correlated to one another;

one or more processors operatively connected to the memory for storing data; the one or more processors being configured to:

provide a first conditional probability distribution, a conditional probability of a target type given a number of measurements, defined inductively by $$p(T|z_{1,2,\ldots,k}) = p(T,z_k|z_{1,2,\ldots,k-1})/\Sigma_{T'} p(T',z_k|z_{1,2,\ldots,k-1}),$$

and $$p(z_k,T|z_{1,2,\ldots,k-1}) = p(T|z_{1,2,\ldots,k-1}) \int p(z_k|T,x_k)p(x_k|T,z_{1,2,\ldots,k-1})dx_k$$

where $p(z_{k,i}|T,x_k)$ is a conditional probability of an ith measurement at a kth instance giving a target type T and hidden states at the kth instance, and $p(T|z_{1,2,\ldots,k-1})$ is a conditional probability distribution of a target type, T, given the plurality of measurements at the $k-1^{th}$ time, $z_{1,\ldots,k-1}$;

use a target type dependent dynamics model to provide evolution from the hidden state at one time to the hidden states at the subsequent time; and obtain an estimate of the target type from the first conditional probability;

wherein $p(T|z_{1,2,\ldots,k})$ is approximated by adaptive quadrature; and wherein $$p(T|z_{1,2,\ldots k}) = p(T, z_k|z_{1,2,\ldots k-1})/\Sigma_{T'} p(T', z_k|z_{1,2,\ldots k-1}),$$

where $$p(T, z_k|z_{1,2,\ldots k-1}) = p(T|z_{1,2,\ldots k-1}) \times \sum_{i+1,\ldots,|w|} p(z|\hat{U}(\sqrt{2}\,\tilde{U}k_i + \mu^w), T)w_i$$

where
p(T, $z_k|z_{1,2,\ldots k-1}$) is a second conditional probability,
p($z_k|T, x_k$) is a third conditional probability,
a Fisher information is transformed by F=USV$^T$,
U & V are unitary, S is diagonal, $S_{ii} \, S_{jj}$ for i>j, $$s = \sum \max_i S_{ii} \geq \varepsilon$$

for some small $\varepsilon$,
an i-th column of U is denoted by $U_i$ and $\hat{U}$= [$U_1, \ldots, U_s$],
w=$\hat{U}$x,
$\mu^w$ is an expectation of w at step i,
$P^{ww}$ is an expectation of ww$^T$,
$\tilde{U}$ is lower triangular and $\tilde{U}^T\tilde{U}=P^{ww}$,
a new variable v is defined by $$v = \frac{1}{\sqrt{2}} \tilde{U}^{-1}(w - \mu^w),$$

a transformed Fisher information is $\hat{F}=[\hat{U}\tilde{U}^{-1}]^T F \hat{U}\tilde{U}^{-1}$, $q_1$={i: $\hat{F}_{ii} \leq \alpha$}, $q_2$={i: $\hat{F}_{ii} > \alpha$} where $\alpha$ is a constant,
for each i in $q_1$ select Hermite order as $|\beta\hat{F}_{ii}|$ where $\beta$ is a constant yielding weights $w_i$ and knots $k_i$,
for each i in $q_2$ select quadrature order as $$\left\lceil \frac{\hat{F}_{ii}}{\chi} \right\rceil$$

where $\chi$ is a constant yielding weights $w_i$ and knots $k_i$,
$\otimes$ denote the column—wise Khatri—Rao product and $\hat{1}$, a six column vector of ones
w=$w_1 \otimes w_2 \otimes \ldots \otimes w_s$
k=[$\hat{1}_0 k_1 \hat{1}_{s-1}$]$\otimes$[$\hat{1}_1 k_2 \hat{1}_{s-2}$]$\otimes \ldots \otimes$[$\hat{1}_{s-1} k_s \hat{1}_0$].

8. A target identification system, wherein target identification comprises flying object identification, the target identification system comprising:
a memory for storing data comprising:
a data structure stored in the memory, the data structure including:
a number of measurements of a target, each measurement from the number of measurements being observed at a predetermined time ($z_k$);
a number of target types (T); each one of the number of measurements, each one the number of target type and each one of one or more hidden states, each hidden state ($x_k$) being characterized at the predetermined time, being correlated to one another;
one or more processors operatively connected to the memory for storing data; the one or more processors being configured to:
provide a first conditional probability distribution, a conditional probability of a target type given a number of measurements, defined inductively $p(T|z_{1,2,\ldots k})=p(T,z_k|z_{1,2,\ldots k-1})/\Sigma_{T'} p(T',z_k|z_{1,2,\ldots k-1}),$ and $p(z_k,T|z_{1,2,\ldots k-1})=p(T|z_{1,2,\ldots k-1}) \int p(z_k|T,x_k)p(x_k|T,z_{1,2,\ldots k-1})dx_k$ where p($z_{k,i}|T,x_k$) is a conditional probability of an ith measurement at a kth instance giving a target type T and hidden states at the kth instance, and
p(T|$z_{1,2,\ldots k-1}$) is a conditional probability distribution of a target type, T, given the plurality of measurements at the k-1$^{th}$ time, $z_{1,\ldots k-1}$;
use a target type dependent dynamics model to provide evolution from the hidden state at one time to the hidden states at the subsequent time; and
obtain an estimate of the target type from the first conditional probability; and
a non-transitory computer usable media having computer readable code embodied therein, wherein the computer readable code, when executed by the one or more processors, causes the one or more processors to:
provide a first conditional probability distribution a conditional probability of a target type given a number of measurements, defined inductively by $$p(T|z_{1,2,\ldots,k}) = p(z_k, T|z_{1,2,\ldots,k-1}) / \sum_{T'} p(z_k, T'|z_{1,2,\ldots,k-1}),$$

and $$p(z_k, T|z_{1,2,\ldots,k-1}) = p(T|z_{1,2,\ldots,k-1}) \int p(z_k|T,x_k)p(x_k|T,z_{1,2,\ldots,k-1})dx_k$$

where p($z_{k,i}|T,x_k$) is a conditional probability of an ith measurement at a kth instance giving a target type T and hidden states at the kth instance, and
p(T|$z_{1,2,\ldots k-1}$) is a conditional probability distribution of a target type, T, given the plurality of measurements at the k-1$^{th}$ time, $z_{1,\ldots k-1}$; and
obtain an estimate of the target type from the first conditional probability; thereby configuring the one or more processors;
wherein p(T|$z_{1,2,\ldots k}$) is approximated by adaptive quadrature; and wherein $$p(T|z_{1,2,\ldots k}) = p(T, z_k|z_{1,2,\ldots,k-1})/\Sigma_{T'} p(T', z_k|z_{1,2,\ldots,k-1}),$$

where $$p(T, z_k|z_{1,2,\ldots,k-1}) = p(T|z_{1,2,\ldots,k-1}) \times \sum_{i+1,\ldots,|w|} p(z|\hat{U}(\sqrt{2}\,\tilde{U}k_i + \mu^w), T)w_i$$

where
p(T, $z_k|z_{1,2,\ldots k-1}$) is a second conditional probability,
p($z_k|T, x_k$) is a third conditional probability,
a Fisher information is transformed by F=USV$^T$,
U & V are unitary, S is diagonal, $S_{ii} \, S_{jj}$ for i>j, $$s = \sum \max_i S_{ii} \geq \varepsilon$$

for some small $\varepsilon$,
an i-th column of U is denoted by $U_i$ and $\hat{U}$= [$U_1, \ldots, U_s$],
w=$\hat{U}$x,
$\mu^w$ is an expectation of w at step i,
$P^{ww}$ is an expectation of ww$^T$,
$\tilde{U}$ is lower triangular and $\tilde{U}^T\tilde{U}=P^{ww}$,
a new variable v is defined by $$v = \frac{1}{\sqrt{2}} \tilde{U}^{-1}(w - \mu^w),$$

a transformed Fisher information is $\hat{F}=[\hat{U}\tilde{U}^{-1}]^T F \hat{U}\tilde{U}^{-1}$,
$q_1$={i: $\hat{F}_{ii} \leq \alpha$}, $q_2$={i:$\hat{F}_{ii} > \alpha$} where $\alpha$ is a constant, for each i in $q_1$ select Hermite order as $|\beta \hat{F}_{ii}|$ where $\beta$ is a constant yielding weights $w_i$ and knots $k_i$,
for each i in $q_2$ select quadrature order as $$\left\lceil \frac{\hat{F}_{ii}}{\chi} \right\rceil$$

where $\chi$ is a constant yielding weights $w_i$ and knots $k_i$,
$\otimes$ denote the column—wise Khatri—Rao product and $\hat{1}_i$ a six column vector of ones
$w = w_1 \otimes w_2 \otimes \ldots \otimes w_s$
$k = [\hat{1}_0 k_1 \hat{1}_{s-1}] \otimes [\hat{1}_1 k_2 \hat{1}_{s-2}] \otimes \ldots \otimes [\hat{1}_{s-1} k_s \hat{1}_0]$.

9. A method for target identification, wherein target identification comprises flying object identification, the method comprising:

receiving, at one or more processors, a number of measurements of a target, each measurement from the number of measurements being observed at a predetermined time ($z_k$), a number of target types (T); each one of the number of measurements, each one the number of target type and each one of one or more hidden states, each hidden state ($x_k$) being characterized at the predetermined time, being correlated to one another;

providing, using the one or more processors, a first conditional probability distribution, a conditional probability of a target type given a number of measurements, defined inductively by $p(T|z_{1,2,\ldots k}) = p(T,z_k|z_{1,2,\ldots k-1}) / \Sigma_{T'} p(T',z_k|z_{1,2,\ldots k-1})$, and $p(z_k,T|z_{1,2,\ldots,k-1}) = p(T|z_{1,2,\ldots,k-1}) \int p(z_k|T,x_k) p(x_k|T,z_{1,2,\ldots,k-1}) dx_k$ where $p(z_{k,i}|T,x_k)$ is a conditional probability of an ith measurement at a kth instance giving a target type T and hidden states at the kth instance, and
$p(T|z_{1,2,\ldots k-1})$ is a conditional probability distribution of a target type, T, given the plurality of measurements at the k-1$^{th}$ time, $z_{1,\ldots k-1}$; and obtaining an estimate of the target type from the first conditional probability; wherein the providing a first conditional probability distribution and the obtaining an estimate of the target type are performed by the one or more processors executing computer readable code embodied in non-transitory computer usable media;

wherein $p(x_k|x_{k-1},T)$ is a multivariate Gaussian distribution and wherein $p(x_k|T, z_k)$ is another multivariate Gaussian distribution, where $p(x_k|x_{k-1},T)$ is a conditional probability distribution of hidden states at instance k given hidden states at instance k-1 and target type T;

wherein transition between one hidden state at one instance and the one hidden state at another instance is given by a predetermined dynamic model (referred to as $f_k(x_{k-1}, T)$) and wherein an expectation of $p(x_k|T, z_{1,2,\ldots k-1})$ is given by $\mu_{k,k-1}^{x|} = \int f_k(x_{k-1}) N(x_k; \mu_{k-1,k-1}^{x|T}, P_{k-1,k-1}^{xx|T}) dx_{k-1}$ and a covariance matrix is given inductively by $P_{k,k-1}^{xx} = Q_k + \int f_k(x_{k-1}) f_k^T(x_{k-1}) N(x_k; \mu_{k-1,k-1}^{x} P_{k-1,k-1}^{xx|T}) dx_{k-1} - [\mu_{k,k-1}^{x}]^T \mu_{k,k-1}^{x}$.

10. The method of claim 9 wherein measurements are a predetermined function of target state and type (referred to as $h_k(x_k, T)$) corrupted by independent noise; and wherein $p(x_k|T, z_{1,2,\ldots k-1})$ is a multivariate Gaussian distribution.

11. The method of claim 9 wherein the estimate is obtained using a Bayes Classifier.

12. The method of claim 9 wherein:
a transformed Fisher information is $\hat{F} = [\hat{U}\tilde{U}^{-1}]^T F \hat{U}\tilde{U}^{-1}$,
$q_1 = \{i: \hat{F}_{ii} \leq \alpha\}$, $q_2 = \{i: \hat{F}_{ii} > \alpha\}$ where $\alpha$ is a constant
for each i in $q_1$ select Hermite order as $|\alpha \hat{F}_{ii}|$ where $\beta$ is a constant yielding weights $w_i$ and knots $k_i$,
for each i in $q_2$ select quadrature order as $$\left\lceil \frac{\hat{F}_{ii}}{\chi} \right\rceil$$

where $\chi$ is a constant yielding weights $w_i$ and knots $k_i$,
$\otimes$ denote the column—wise Khatri—Rao product and $\hat{1}_i$ a six column vector of ones
$w = w_1 \otimes w_2 \otimes \ldots \otimes w_s$ and
$k = [\hat{1}_0 k_1 \hat{1}_{s-1}] \otimes [\hat{1}_1 k_2 \hat{1}_{s-2}] \otimes \ldots \otimes [\hat{1}_{s-1} k_s \hat{1}_0]$;
wherein $$\int p(z|\hat{U}(\sqrt{2}\tilde{U}v + \mu^w), T) e^{-v^T v} dv \approx \sum_{i=1,\ldots|w|} p(z|\hat{U}(\sqrt{2}\tilde{U}k_i + \mu^w), T) w_i.$$

13. A method for target identification, wherein target identification comprises flying object identification, the method comprising:

receiving, at one or more processors, a number of measurements of a target, each measurement from the number of measurements being observed at a predetermined time ($z_k$), a number of target types (T); each one of the number of measurements, each one the number of target type and each one of one or more hidden states, each hidden state ($x_k$) being characterized at the predetermined time, being correlated to one another;

providing, using the one or more processors, a first conditional probability distribution, a conditional probability of a target type given a number of measurements, defined inductively by $p(T|z_{1,2,\ldots k}) = p(T,z_k|z_{1,2,\ldots k-1}) / \Sigma_{T'} p(T',z_k|z_{1,2,\ldots k-1})$, and $p(z_k,T|z_{1,2,\ldots,k-1}) = p(T|z_{1,2,\ldots,k-1}) \int p(z_k|T,x_k) p(x_k|T,z_{1,2,\ldots,k-1}) dx_k$ where $p(z_{k,i}|T,x_k)$ is a conditional probability of an ith measurement at a kth instance giving a target type T and hidden states at the kth instance, using a target type dependent dynamics model to provide evolution from the hidden state at one time to the hidden states at the subsequent time; and
$p(T|z_{1,2,\ldots k-1})$ is a conditional probability distribution of a target type, T, given the plurality of measurements at the k-1$^{th}$ time, $z_{1,\ldots k-1}$; and obtaining an estimate of the target type from the first conditional probability; wherein the providing a first conditional probability distribution and the obtaining an estimate of the target type are performed by the one or more processors executing computer readable code embodied in non-transitory computer usable media;
wherein $p(T|z_{1,2,\ldots,k})$ is approximated by adaptive quadrature; and wherein $$p(T \mid z_{1,2,\ldots,k}) = p(T, z_k \mid z_{1,2,\ldots,k-1})/\Sigma_{T'} p(T', z_k \mid z_{1,2,\ldots,k-1}),$$

here $$p(T, z_k \mid z_{1,2,\ldots,k-1}) = p(T \mid z_{1,2,\ldots,k-1}) \times \sum_{i+1,\ldots,|w|} p(z \mid \hat{U}(\sqrt{2}\,\tilde{U}k_i + \mu^w), T)w_i$$

where
$p(T, z_k | z_{1,2,\ldots,k-1})$ is a second conditional probability,
$p(z_k | T, x_k)$ is a third conditional probability,
a Fisher information is transformed by $F = USV^T$,
U & V are unitary, S is diagonal, $S_{ii} \geq S_{jj}$ for $i > j$, $$s = \sum \max_i S_{ii} \geq \varepsilon$$

for some small $\epsilon$,
an i-th column of U is denoted by $U_i$ and $\hat{U} = [U_1, \ldots, U_s]$,
$w = \hat{U}x$,
$\mu^w$ is an expectation of w at step i,
$P^{ww}$ is an expectation of $ww^T$,
$\tilde{U}$ is lower triangular and $\tilde{U}^T\tilde{U} = P^{ww}$,
a new variable v is defined by $$v = \frac{1}{\sqrt{2}}\tilde{U}^{-1}(w - \mu^w),$$

a transformed Fisher information is $\hat{F} = [\hat{U}\tilde{U}^{-1}]^T F \hat{U}\tilde{U}^{-1}$,
$q_1 = \{i : \hat{F} \leq \alpha\}$, $q_2 = \{i : \hat{F}_{ii} > \alpha\}$ where $\alpha$ is a constant,
for each i in $q_1$ select Hermite order as $|\beta \hat{F}_{ii}|$ where $\beta$ is a constant yielding weights $w_i$ and knots $k_1$,
for each i in $q_2$ select quadrature order as $$\left[\begin{array}{c}\hat{F}_{ii} \\ \chi\end{array}\right]$$

where $\chi$ is a constant yielding weights $w_i$ and knots $k_i$,
$\otimes$ denote the column—wise Khatri—Rao product and $\hat{1}_s$ a six column vector of ones
$w = w_1 \otimes w_2 \otimes \ldots \otimes w_s$
$k = [\hat{1}_0 k_1 \hat{1}_{s-1}] \otimes [\hat{1}_1 k_2 \hat{1}_{s-2}] \otimes \ldots \otimes [\hat{1}_{s-1} k_s \hat{1}_0]$.

14. The method of claim 13 wherein providing a first conditional probability comprises:
inductively obtaining hidden state information at a kth stage from hidden state information at a preceding (k−1)th stage;
obtaining a fourth conditional probability of a hidden state given a target type and a number of measurements, $p(x_k | T, z_{1,2,\ldots,k-1})$; and
obtaining the first conditional probability, expressed inductively, as a function of the fourth conditional probability.

15. The method of claim 13 wherein in defining inductively the first conditional probability as:

$$p(T \mid z_{1,2,\ldots,k}) = \frac{p(z_k, T \mid z_{1,2,\ldots,k-1})}{\sum_{\hat{T}} p(z_k, \hat{T} \mid z_{1,2,\ldots,k-1})},$$

$$p(z_k, T \mid z_{1,2,\ldots,k-1}) = p(T \mid z_{1,2,\ldots,k-1}) \int p(z_k \mid T, x_k) p(x_k \mid T, z_{1,2,\ldots,k-1}) dx_k.$$

16. The method of claim 15 wherein the third and fourth conditional probabilities are represented by multivariate Gaussian probability functions.

17. The method of claim 16 wherein providing the first conditional probability distribution further comprises:
using subspace partitioning to reduce dimensions of integration variable space of integral $$\int p(z_k | T, x_k) N(x_k; \mu^x_{k,k-1}, P^{xx}_{k,k-1}) dx_k;$$

transforming variables in the integral in order to apply whitening; and
applying different approximation methods to regions of more importance and regions of less importance, importance measured by Fisher information, in order to approximate the integral by a sum, $$\sum_{i+1,\ldots,|w|} p(z \mid \hat{U}(\sqrt{2}\,\tilde{U}k_i + \mu^w), T)w_i.$$

18. The method of claim 17 wherein using subspace partitioning comprises:
transforming the integration variable space by $w = \hat{U}x$, where
a Fisher information is transformed by $F = USV^T$,
U & V are unitary, S is diagonal, $S_{ii}\ S_{jj}$ for $i > j$, $$s = \sum \max_i S_{ii} \geq \varepsilon$$

for some small $\epsilon$, and
an i-th column of U is denoted by $U_i$ and $\hat{U} = [U_1, \ldots, U_s]$.

19. The method of claim 18 wherein transforming variables in the integral in order to apply whitening comprises:
transforming from w to
a new variable v defined by $$v = \frac{1}{\sqrt{2}}\tilde{U}^{-1}(w - \mu^w)$$

in order to apply whitening.

20. A non-transitory computer readable medium having computer executable code embodied therein, said computer executable code, when executed in at least one processor, causing the at least one processor to:
receive, at the at least one processor, a number of measurements of a target, each measurement from the number of measurements being observed at a predetermined time ($z_k$), a number of target types (T); each one of the number of measurements, each one the number of target type and each one of one or more hidden states, each hidden state ($x_k$) being characterized at the predetermined time, being correlated to one another;

provide a first conditional probability distribution, a conditional probability of a target type given a number of measurements, defined inductively by $$p(T\mid z_{1,2,\ldots,k}) = \frac{p(z_k, T\mid z_{1,2,\ldots,k-1})}{\sum_{\hat{T}} p(z_k, \hat{T}\mid z_{1,2,\ldots,k-1})},$$

and $$p(z_k, T\mid z_{1,2,\ldots,k-1}) = p(T\mid z_{1,2,\ldots,k-1})\int p(z_k\mid T, x_k)p(x_k\mid T, z_{1,2,\ldots,k-1})dx_k$$

where $p(z_{k,i}|T,x_k)$ is a conditional probability of an ith measurement at a kth instance giving a target type T and hidden states at the kth instance, and $p(T|z_{1, 2, \ldots k-1})$ is a conditional probability distribution of a target type, T, given the plurality of measurements at the $k-1^{th}$ time, $z_{1, \ldots k-1}$;

and obtain an estimate of the target type from the first conditional probability;

wherein target identification comprises flying object identification and target type comprises flying object type;

wherein $p(x_k|x_{k-1},T)$ is a multivariate Gaussian distribution and wherein $p(x_k|T, z_k)$ is another multivariate Gaussian distribution, where $p(x_k|x_{k-1},T)$ is a conditional probability distribution of hidden states at instance k given hidden states at instance k−1 and target type T;

wherein transition between one hidden state at one instance and the one hidden state at another instance is given by a predetermined dynamic model (referred to as $f_k(x_{k-1}, T)$) and wherein an expectation of $p(x_k|T, z_{1,2,\ldots k-1})$ is given by $$\mu_{k,k-1}{}^x = \int f_k(x_{k-1})N(x_k;\mu_{k-1,k-1}{}^{x|T}, P_{k-1,k-1}{}^{xx|T})dx_{k-1}$$

and a covariance matrix is given inductively by $$-P_{k,k-1}{}^{xx}Q_k\int f_k(x_{k-1})f_k{}^T(x_{k-1})N(x_k;\mu_{k-1,k-1}{}^x,P_{k-1,k-1}{}^{xx|T})dx_{k-1} - [\mu_{k,k-1}{}^x]^T\mu_{k,k-1}{}^x.$$

21. The non-transitory computer readable medium of claim 20 wherein measurements are a predetermined function of target state and type (referred to as $h_k(x_k, T)$) corrupted by independent noise; and wherein $p(x_k|T, z_{1,2, \ldots k-1})$ is a multivariate Gaussian distribution.

22. A non-transitory computer readable medium having computer executable code embodied therein, said computer executable code, when executed in at least one processor, causing the at least one processor to:

receive, at the at least one processor, a number of measurements of a target, each measurement from the number of measurements being observed at a predetermined time ($z_k$), a number of target types (T); each one of the number of measurements, each one the number of target type and each one of one or more hidden states, each hidden state ($x_k$) being characterized at the predetermined time, being correlated to one another;

provide a first conditional probability distribution, a conditional probability of a target type given a number of measurements, defined inductively by $$p(T\mid z_{1,2,\ldots,k-1}) = \frac{p(z_k, T\mid z_{1,2,\ldots,k-1})}{\sum_{\hat{T}} p(z_k, \hat{T}\mid z_{1,2,\ldots,k-1})},$$

and $$p(z_k, T\mid z_{1,2,\ldots,k-1}) = p(T\mid z_{1,2,\ldots,k-1})\int p(z_k\mid T, x_k)p(x_k\mid T, z_{1,2,\ldots,k-1})dx_k$$

where $p(z_{k,i}|T,x_k)$ is a conditional probability of an ith measurement at a kth instance giving a target type T and hidden states at the kth instance, and $p(T|z_{1, 2, \ldots k-1})$ is a conditional probability distribution of a target type, T, given the plurality of measurements at the $k-1^{th}$ time, $z_{1, \ldots k-1}$;

use a target type dependent dynamics model to provide evolution from the hidden state at one time to the hidden states at the subsequent time; and obtain an estimate of the target type from the first conditional probability;

wherein target identification comprises flying object identification and target type comprises flying object type;

wherein $p(T|z_{1,2, \ldots, k})$ is approximated by adaptive quadrature; and wherein $$p(T\mid z_{1,2,\ldots k}) = p(T, z_k\mid z_{1,2,\ldots k-1})/\Sigma_{T'}p(T', z_k\mid z_{1,2,\ldots k-1}),$$

where $$p(T, z_k\mid z_{1,2,\ldots k-1}) = p(T\mid z_{1,2,\ldots k-1}) \times \sum_{i=1,\ldots,|w|} p(z\mid \hat{U}(\sqrt{2}\,\tilde{U}k_i + \mu^w), T)w_i$$

where $p(T,z_k|z_{1,2, \ldots k-1})$ is a second conditional probability, $p(z_k|T, x_k)$ is a third conditional probability, a Fisher information is transformed by $F=USV^T$, U & V are unitary, S is diagonal, $S_{ii} \geq S_{jj}$ for i>j, $$s = \sum_i{}^{\max} S_{ii} \geq \varepsilon$$

for some small $\varepsilon$, an i-th column of U is denoted by $U_i$ and $\hat{U} = [U_1, \ldots, U_s]$, $w = \hat{U}x$, $\mu^w$ is an expectation of w at step i, $P^{ww}$ is an expectation of $ww^T$, $\tilde{U}$ is lower triangular and $\tilde{U}^T\tilde{U} = P^{ww}$, a new variable v is defined by $$v = \frac{1}{\sqrt{2}}\tilde{U}^{-1}(w - \mu^w),$$

a transformed Fisher information is $\hat{F} = [\hat{U}\tilde{U}^{-1}]^T F \hat{U}\tilde{U}^{-1}$, $q_1 = \{i:\hat{F}_{ii} \leq \alpha\}$, $q_2 = \{i:\hat{F}_{ii} > \alpha\}$ where $\alpha$ is a constant, for each i in $q_1$ select Hermite order as $|\beta\hat{F}_{ii}|$ where $\beta$ is a constant yielding weights $w_i$ and knots $k_i$, for each i in $q_2$ select quadrature order as $$\left\lceil \frac{\hat{F}_{ii}}{\chi} \right\rceil$$

where $\chi$ is a constant yielding weights $w_i$ and knots $k_i$,
⊗ denote the column—wise Khatri—Rao product and $\hat{I}_i$ a six column vector of ones
$w = w_1 \otimes w_2 \otimes \ldots \otimes w_s$
$k = [\hat{I}_0 k_1 \hat{I}_{s-1}] \otimes [\hat{I}_1 k_2 \hat{I}_{s-2}] \otimes \ldots \otimes [\hat{I}_{s-1} k_s \hat{I}_0]$.

23. The non-transitory computer readable medium of claim 22 wherein providing a first conditional probability comprises:
inductively obtaining hidden state information at a kth stage from hidden state information at a preceding (k−1)th stage;
obtaining a fourth conditional probability of a hidden state given a target type and a number of measurements, $p(x_k|T, z_{1,2,\ldots,k-1})$; and
obtaining the first conditional probability, expressed inductively, as a function of the fourth conditional probability.

24. The non-transitory computer readable medium of claim 23 wherein in defining inductively the first conditional probability as $$p(T|z_{1,2,\ldots,k}) = \frac{p(z_k, T|z_{1,2,\ldots,k-1})}{\sum_{\hat{T}} p(z_k, \hat{T}|z_{1,2,\ldots,k-1})},$$

$$p(z_k, T|z_{1,2,\ldots,k-1}) = p(T|z_{1,2,\ldots,k-1}) \int p(z_k|T, x_k) p(x_k|T, z_{1,2,\ldots,k-1}) dx_k.$$

25. The non-transitory computer readable medium of claim 24 wherein the third and fourth conditional probabilities are represented by multivariate Gaussian probability functions.

26. The non-transitory computer readable medium of 31 wherein providing the first conditional probability distribution further comprises:
using subspace partitioning to reduce dimensions of integration variable space of integral $\int p(z_k|T, x_k) N(x_k; \mu_{k,k-1}^x, P_{k,k-1}^{xx}) dx_k$;
transforming variables in the integral in order to apply whitening; and
applying different approximation methods to regions of more importance and regions of less importance, importance measured by Fisher information, in order to approximate the integral by a sum, $$\sum_{i=1,\ldots,|w|} p(z|\hat{U}(\sqrt{2}\tilde{U}k_i + \mu^w), T) w_i.$$

27. The non-transitory computer readable medium of claim 26 wherein using subspace partitioning comprises:
transforming the integration variable space by $w = \hat{U}x$, where
a Fisher information is transformed by $F = USV^T$
U & V are unitary, S is diagonal, $S_{ii} \geq S_{jj}$ for $i > j$, $$s = \max_i S_{ii} \geq \varepsilon$$

for some small $\varepsilon$, and
an i-th column of U is denoted by $U_i$ and $\hat{U} = [U_1, \ldots, U_s]$.

28. The non-transitory computer readable medium of claim 27 wherein transforming variables in the integral in order to apply whitening comprises:
transforming from w to
a new variable v defined by $$v = \frac{1}{\sqrt{2}} \tilde{U}^{-1}(w - \mu^w)$$

in order to apply whitening.

29. The non-transitory computer readable medium of claim 28 wherein
a transformed Fisher information is $\hat{F} = [\hat{U}\tilde{U}^{-1}]^T F \hat{U}\tilde{U}^{-1}$,
$q_1 = \{i: \hat{F}_{ii} \leq \alpha\}$, $q_2 = \{i: \hat{F}_{ii} > \alpha\}$ where $\alpha$ is a constant,
for each i in $q_1$ select Hermite order as $|\beta \hat{F}_{ii}|$ where $\beta$ is a constant yielding weights $w_i$ and knots $k_i$,
for each i in $q_2$ select quadrature order as $$\left\lceil \frac{\hat{F}_{ii}}{\chi} \right\rceil$$

where $\chi$ is a constant yielding weights $w_i$ and knots $k_i$,
⊗ denote the column—wise Khatri—Rao product and $\hat{I}_i$ a six column vector of ones and
$w = w_1 \otimes w_2 \otimes \ldots \otimes w_s$
$k = [\hat{I}_0 k_1 \hat{I}_{s-1}] \otimes [\hat{I}_1 k_2 \hat{I}_{s-2}] \otimes \ldots \otimes [\hat{I}_{s-1} k_s \hat{I}_0]$;
wherein $$\int p(z|\hat{U}(\sqrt{2}\tilde{U}v + \mu^w), T) e^{-v^T v} dv \approx \sum_{i=1,\ldots,|w|} p(z|\hat{U}(\sqrt{2}\tilde{U}k_i + \mu^w), T) w_i.$$

* * * * *